(12) United States Patent
Kurz et al.

(10) Patent No.: US 11,708,057 B2
(45) Date of Patent: Jul. 25, 2023

(54) PRESSURE-MEDIUM CONTROL VALVE AND PISTON PUMP FOR AN ELECTRONICALLY SLIP-CONTROLLABLE VEHICLE BRAKE SYSTEM

(71) Applicant: Robert Bosch GmbH, Stuttgart (DE)

(72) Inventors: Edgar Kurz, Heilbronn-Horkheim (DE); Juergen Haecker, Schwieberdingen (DE)

(73) Assignee: Robert Bosch GmbH, Stuttgart (DE)

(*) Notice: Subject to any disclaimer, the term of this patent is extended or adjusted under 35 U.S.C. 154(b) by 510 days.

(21) Appl. No.: 16/634,562

(22) PCT Filed: Jul. 30, 2018

(86) PCT No.: PCT/EP2018/070542
§ 371 (c)(1),
(2) Date: Jan. 27, 2020

(87) PCT Pub. No.: WO2019/057374
PCT Pub. Date: Mar. 28, 2019

(65) Prior Publication Data
US 2020/0262401 A1    Aug. 20, 2020

(30) Foreign Application Priority Data

Sep. 25, 2017    (DE) ...................... 10 2017 216 900.1

(51) Int. Cl.
*F04B 1/0452*    (2020.01)
*B60T 8/40*    (2006.01)
(Continued)

(52) U.S. Cl.
CPC .......... *B60T 8/4031* (2013.01); *F04B 1/0421* (2013.01); *B60T 17/02* (2013.01);
(Continued)

(58) Field of Classification Search
CPC ...................... F04B 9/042–045; F04B 7/0266; F04B 53/10; F04B 53/1087; F04B 1/0421;
(Continued)

(56) References Cited

U.S. PATENT DOCUMENTS 5,320,498 A * 6/1994 Fuchida ................ B60T 8/4031
417/214
6,244,295 B1 * 6/2001 Bartussek ............. F16K 15/044
137/540
(Continued)

FOREIGN PATENT DOCUMENTS

DE    10 2009 054 933 A1    6/2011
DE    10 2010 040 329 A1    3/2012
(Continued)

OTHER PUBLICATIONS

International Search Report corresponding to PCT Application No. PCT/EP2018/070542, dated Oct. 22, 2018 German and English language document) (7 pages).

*Primary Examiner* — Thomas Fink
(74) *Attorney, Agent, or Firm* — Maginot, Moore & Beck LLP

(57) ABSTRACT

A piston pump for pumping a pressure medium in an electronically slip-controllable vehicle brake system includes a pressure-medium control valve configured to control a throughflow direction in a pressure medium circuit. The pressure-medium control valve has a valve housing, a valve seat, and a valve-closing body that is received in the valve housing in an axially movable and radially guided manner. The valve-closing body is configured to control the valve seat according to the prevailing pressure ratios upstream and downstream of the valve seat. The valve seat is configured as a single component with the valve housing. The pressure-medium control valve is produced by forming in a compact and cost-effective manner. The pressure-
(Continued)

medium control valve operates quietly and is configured to be used alternatively as an independent unit that is configured to be tested prior to use.

7 Claims, 2 Drawing Sheets

(51) Int. Cl.
*F04B 1/0421* (2020.01)
*B60T 17/02* (2006.01)
*F04B 1/0408* (2020.01)
*F04B 53/10* (2006.01)
*F16K 27/02* (2006.01)

(52) U.S. Cl.
CPC .......... *F04B 1/0408* (2013.01); *F04B 1/0452* (2013.01); *F04B 53/1087* (2013.01); *F16K 27/0209* (2013.01)

(58) Field of Classification Search
CPC ................. F04B 1/0408; F04B 1/0452; F16K 15/025–026; F16K 27/0209; F16K 1/42; B60T 8/4031; B60T 17/02
See application file for complete search history.

(56) References Cited

U.S. PATENT DOCUMENTS

| | | | | |
|---|---|---|---|---|
| 6,427,972 | B1* | 8/2002 | Kirschner | B60T 8/363 251/129.15 |
| 6,474,963 | B1* | 11/2002 | Wetzel | F04B 19/022 417/470 |
| 7,478,998 | B2* | 1/2009 | Dinkel | B60T 8/4031 417/470 |
| 2012/0227837 | A1* | 9/2012 | Lee | F16K 27/0209 137/511 |
| 2013/0156613 | A1* | 6/2013 | Reuter | F04B 1/0404 417/313 |
| 2013/0199636 | A1 | 8/2013 | Doh | |

FOREIGN PATENT DOCUMENTS

| | | |
|---|---|---|
| DE | 10 2012 219 820 A1 | 4/2014 |
| DE | 10 2012 223 119 A1 | 6/2014 |
| DE | 102013210419 A1 | 12/2014 |
| EP | 0 268 520 A2 | 5/1988 |
| JP | 2001-504931 A | 4/2001 |
| KR | 2000-0068948 A | 11/2000 |
| KR | 10-2012-0103864 A | 9/2012 |

* cited by examiner

PRESSURE-MEDIUM CONTROL VALVE AND PISTON PUMP FOR AN ELECTRONICALLY SLIP-CONTROLLABLE VEHICLE BRAKE SYSTEM This application is a 35 U.S.C. § 371 National Stage Application of PCT/EP2018/070542, filed on Jul. 30, 2018, which claims the benefit of priority to Serial No. DE 10 2017 216 900.1, filed on Sep. 25, 2017 in Germany, the disclosures of which are incorporated herein by reference in their entirety.

BACKGROUND

The disclosure relates to a pressure-medium control valve, in particular for controlling a throughflow direction in a pressure-medium circuit, and to a piston pump, in particular for pumping a pressure medium in an electronically slip-controllable vehicle brake system.

A pressure-medium control valve is known, for example, from DE 10 2010 040 329 A1.

This known pressure-medium control valve has a valve housing, a valve closing body which is received in an axially movable manner and radially guided inside the valve housing, and a valve seat which is controlled by the valve closing body in dependence on a prevailing pressure difference between the pressures upstream and downstream of the valve seat.

The valve housing is produced by a forming technique by deep-drawing. It is cup-shaped and has at its end remote from the valve seat a base which closes the valve housing.

The valve seat controlled by the valve closing body is arranged detached from the valve housing on a cylinder liner of a piston pump.

SUMMARY

A pressure-medium control valve according to the disclosure has the advantage over the known valve that the valve seat is formed in one piece with the valve housing produced by a forming technique.

A valve housing formed in that manner is inexpensive to produce and additionally has compact external dimensions. The one-piece form makes possible a particularly low error of coaxiality between the guiding of the valve closing body and the valve seat. As a result, the valve closing body can be guided particularly closely, that is to say with a small clearance, which in turn has an advantageous effect in respect of minimizing the flow of pressure medium around the valve closing body and a tendency of the valve closing body to vibrate undesirably. As a result, an improvement in the operating noise of the pressure-medium control valve is achieved.

Further advantages or advantageous further developments of the disclosure will become apparent from the dependent claims and from the following description.

A housing shaft of the valve housing which is open towards the environment of the pressure-medium control valve is on the one hand necessary for the installation of the valve closing body and a valve spring which acts on the valve closing body into the valve housing, and on the other hand makes it possible to produce the valve housing with the valve seat solely by a forming technique, for example from a sheet metal plate. Expensive metal-cutting operations for producing the valve housing can thus be saved.

A peripheral collar on the valve housing allows the pressure-medium control valve to be centered in an associated valve receiver and additionally makes possible tight contact of the pressure-medium control valve on an adjoining component, for example on a pump cylinder of a piston pump. For reasons relating to forming technology, the collar consists of two crimped wall portions of the valve housing which are placed together and can be used as a spring seat for a return spring, which acts on the piston, of a piston pump arranged adjacent to the pressure-medium control valve.

By using a housing cover which is fastened to an open end of a housing shaft and covers the opening, the pressure-medium control valve can form a structural unit which is functional per se and can be checked for proper operation prior to technical use.

Furthermore, such a form of a pressure-medium control valve allows freedom in the configuration and production of adjacent components, in particular in the production of a pump cylinder of a piston pump, when the pressure-medium control valve is used as the outlet valve of that piston pump. This is because a valve seat does not have to be formed on the pump cylinder.

A pressure-medium control valve according to the disclosure can advantageously also be used as a check valve in a pressure-medium circuit of any kind.

As already mentioned, the use of a pressure-medium control valve according to the disclosure as the outlet valve of a piston pump is particularly advantageous because of its inexpensive and compact construction and because of its low-noise operation.

Such a piston pump is arranged in a pump receiver of a housing block of a pump unit, wherein the pump receiver is closed with respect to the environment by a closing plug. A transition between two diameter stages of a receiver of the closing plug can form a shoulder on which the pressure-medium control valve lies with the collar of its valve housing and is thereby enclosed in a spatially defined manner between the closing plug and a pump cylinder of the piston pump.

The shoulder can be surrounded on the peripheral side by an axially protruding flange. A first force-based connection can thereby be produced between the flange and the collar of the valve housing, by means of which connection the valve housing is held centered on the closing plug. The flange can further protrude axially relative to the collar of the valve housing and form in that protruding region a second force-based connection with a cylinder lining of the piston pump. In this case, the flange thus also serves to fasten the closing plug fitted with the pressure-medium control valve to the pump cylinder of the piston pump.

If the housing shaft of the valve housing extends into the interior of the recess of the closing plug, an annular gap can be provided between the housing shaft and the wall surrounding the recess, via which annular gap a rear side of the valve closing body remote from the valve seat is contacted by an outlet of the pressure-medium control valve. Pressure equalization at the valve closing member can thus be achieved relatively easily.

BRIEF DESCRIPTION OF THE DRAWINGS

Exemplary embodiments of the disclosure are shown in the drawings and will be described in detail hereinbelow.

Mutually corresponding components, or portions of components, are denoted in the figures with the same reference numerals.

DETAILED DESCRIPTION

Figure 1:
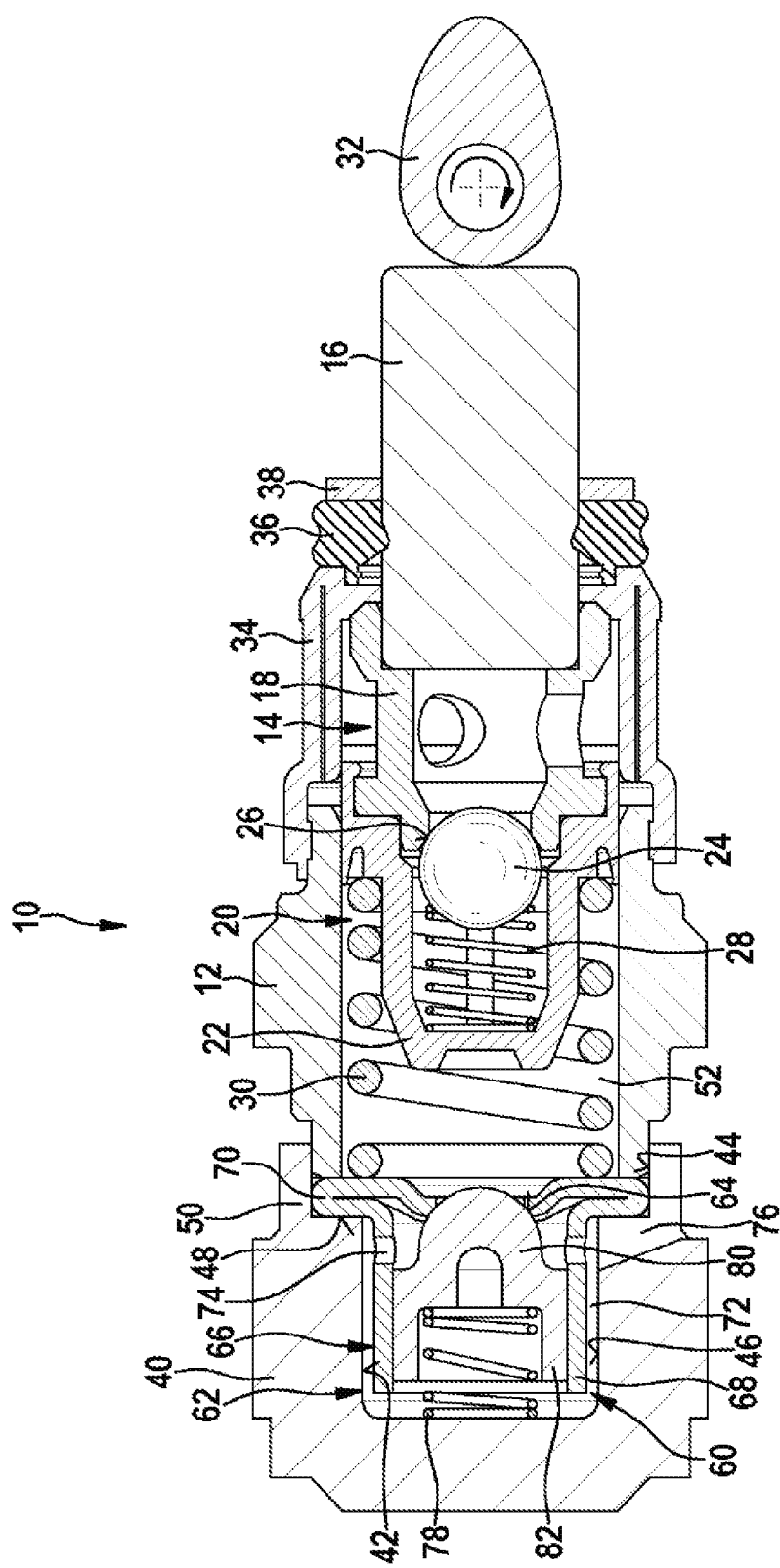
FIG. 1 shows a first exemplary embodiment of a pressure-medium control valve according to the disclosure, wherein this pressure-medium control valve forms an outlet valve of a piston pump. The piston pump is shown in longitudinal section.

FIG. 1 shows a piston pump 10 in longitudinal section. This piston pump 10 comprises a pump cylinder 12 in which a piston assembly 14 is received in an axially displaceable manner and is arranged to be guided radially. The piston assembly 14 comprises a first piston portion 16 of cylindrical solid material, an adjoining hollow-cylindrical second piston portion 18 provided with transverse bores, and an inlet valve 20 adjoining the second piston portion 18. The inlet valve comprises an inlet valve housing 22 in which there are arranged an inlet valve closing body 24 and an inlet valve spring 28 which biases the inlet valve closing body 24 towards an inlet valve seat 26. The inlet valve seat 26 is formed at an end of the second piston portion 18 that faces the inlet valve 20. A ball serves as the inlet valve closing body 24.

The two piston portions 16; 18 and the inlet valve 20 are each connected to one another by a force-based connection to form the piston assembly 14. The piston assembly is driven against the force of a return spring 30 in an axial movement inside the pump cylinder 12. There is preferably used for this purpose an eccentric 32 which can be driven in rotation and which acts on the end face of the first piston portion 16 that is located at the top in the figure.

Attached to the end of the pump cylinder 12 that faces the piston portions 16; 18 is a filter element 34 in sleeve form which surrounds the second piston portion 18 and which is provided to clean pressure medium which flows to the transverse bores of the second piston portion 18 of any impurities, or chips, which it may contain. To that end, the filter element 34 is composed of a filter structure whose openings are covered by a filter fabric through which pressure medium can flow. The filter element 34 carries a sealing ring 36, which rests on the periphery of the first piston portion 16, and a support ring 38 which supports the sealing ring 36 in order to avoid any extrusion of the sealing ring 36 into a gap which exists between the first piston portion 16 and a wall of a pump receiver (not shown) surrounding the first piston portion 16.

A closing plug 40 can further be seen in FIG. 1. The closing plug closes the pump receiver, which has been mentioned but is not shown in the figure, of a pump unit with respect to the outside. The closing plug 40 is cup-shaped and has a centrally arranged receiver 42 which is closed by a base of the closing plug. The receiver 42 is graduated once in its inside diameter at a right angle and accordingly has a first receiving portion 44 with a larger inside diameter which is open towards the end on the pump cylinder side and a smaller second receiving portion 46 which is closed by the base of the closing plug 40. A transition between the two receiving portions 44; 46 is right-angled, so that it forms an annular peripheral shoulder 48. The shoulder 48 is surrounded on the peripheral side by an axially protruding flange 50 of the closing plug 40. The flange 50 extends in some regions beyond the open end of the pump cylinder 12. The internal dimensions of the flange 50 are thereby so matched to the external dimensions of the pump cylinder 12 that a force-based connection can be produced between the components.

The piston pump 10 further has an outlet valve 60 configured according to the disclosure. The outlet valve 60 is arranged in the graduated receiver 42 of the closing plug 40 and, together with the inlet valve 20, controls a flow of hydraulic pressure medium through the piston pump 10. The outlet valve 60 comprises an outlet valve housing 62, an outlet valve seat 64 which is formed in one piece with the outlet valve housing 62 and is arranged at the end facing the open end of the pump cylinder 12, an outlet valve closing body 66 which is received inside the outlet valve housing 62, is received in an axially movable manner and is guided radially, and an outlet valve spring 68 which acts on the outlet valve closing body 66. The outlet valve spring is supported at a first spring end on the base of the receiver 42 of the closing plug 40. The outlet valve housing 62 is produced in one piece by a forming technique and, at its second end opposite the outlet valve seat 64, forms a hollow-cylindrical housing shaft 68 which is open to the outside. The outlet valve closing body 66 is movably received inside the housing shaft 68. The outlet valve seat 64 and the housing shaft 68 are connected together via a peripheral collar 70 which protrudes radially outwards relative to the housing shaft 68. The collar 70 is formed of two housing wall portions which are connected together at the periphery of the collar 70 and placed together in some regions.

With its collar 70, the outlet valve housing 62 rests on the shoulder 48 of the graduated receiver 42 of the closing plug 40. The external dimensions of the collar 70 are so matched to the internal dimensions of the flange 50 surrounding the shoulder 48 that there is a force-based connection between the outlet valve housing 62 and the closing plug 40 which holds the two components together. Furthermore, the closing plug 40 with the fitted pressure-medium control valve or outlet valve 60 is so joined to the pump cylinder 12 that the collar 70 of the outlet valve 60 is enclosed with axial biasing between the shoulder 48 of the closing plug 40 and the facing end face at the open end of the pump cylinder 12.

Furthermore, the housing shaft 68 of the outlet valve housing 62 extends into the interior of the second receiving portion 46 of smaller diameter of the closing plug 40. Between the periphery of the housing shaft 68 and the wall surrounding the second receiving portion 46 there is a peripheral annular gap 72. The annular gap is in contact with an outflow opening 74 of the outlet valve 60 formed on the housing shaft 68 and is also in pressure-medium-conducting communication via the open end of the housing shaft 68 with the rear side of the outlet valve closing body 66 remote from the outlet valve seat 64. An outlet 76 of the piston pump 10 is provided on the peripheral side of the closing stop 40. The outlet 76 is located at least approximately horizontally opposite the outflow opening 74 of the outlet valve 60, wherein a portion of the mentioned annular gap 72 extends between the outflow opening 74 and the outlet 76. A pressure equilibrium therefore prevails at the outlet valve closing body 66.

The outlet valve closing body 66 is divided into a dome-shaped portion 80 which cooperates with the outlet valve seat 64 and a guide portion 82 of cylindrical form which is connected in one piece thereto. The outlet valve closing body 66 rests with its guide portion 82 on the inside of the housing shaft 68. Because the outlet valve seat 64 and the outlet valve housing 62 are in one piece, the achievable error in coaxiality between the outlet valve seat 64 and the guiding of the outlet valve closing body 66 is so small that a relatively narrow guide gap between the components is sufficient. A narrow guide gap prevents pressure medium from flowing around the outlet valve closing body 66 and thus prevents noise-generating vibrations of the outlet valve closing body 66. The outlet valve closing body 66 is hollow and forms in its interior a support surface for one end of an outlet valve spring 78.

The return spring 30 of the piston pump is accommodated in a pump working chamber 52 and is clamped between a first contact surface formed on the inlet valve housing 22 and a second contact surface formed on the collar 70 of the outlet valve housing 62. By means of cyclic actuation of the piston assembly 14 by the eccentric 32, the pump working chamber 52 changes its volume and a pressure medium is pumped via the inlet valve 20 through the pump working chamber 52 to the outlet valve 60 and, from there, via the outflow opening 74 to the outlet 76 of the piston pump 10.

Figure 2:
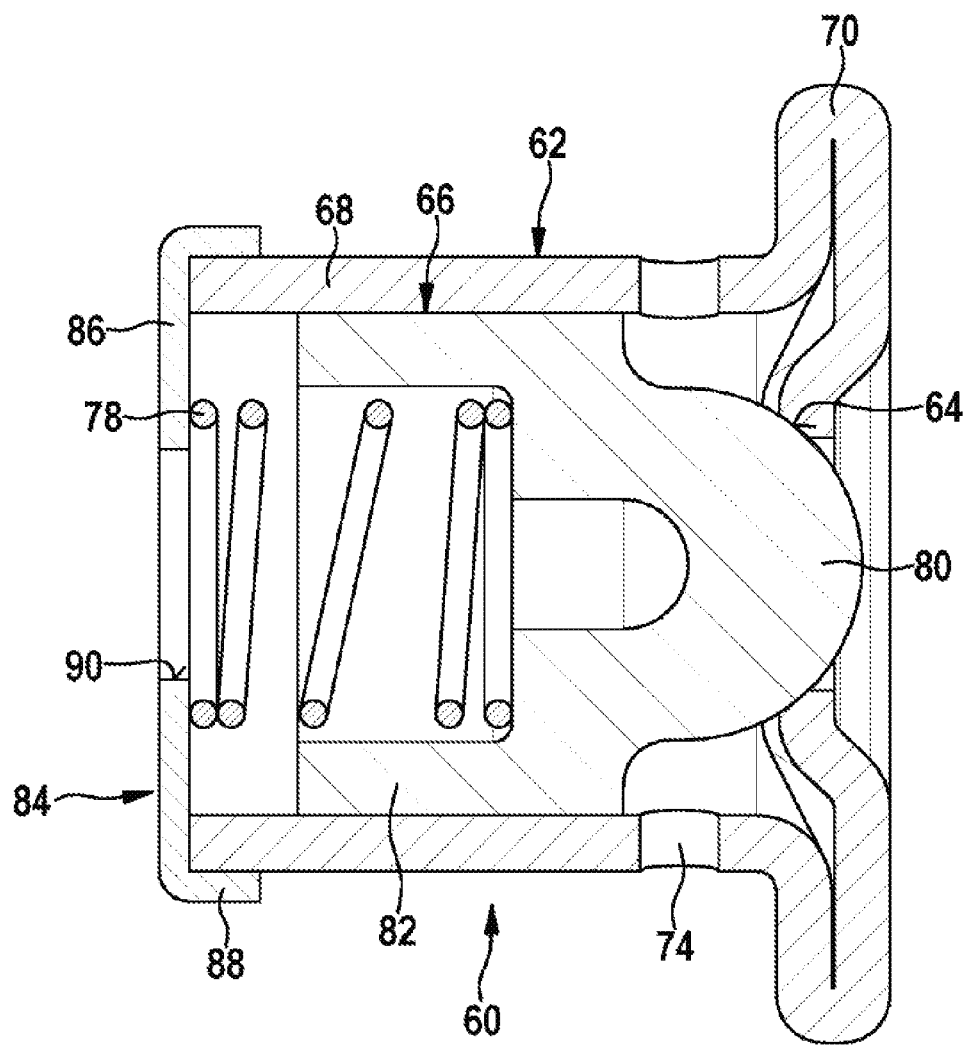
FIG. 2 shows a second exemplary embodiment of a pressure-medium control valve according to the disclosure. This is designed as an independent structural unit, which is likewise shown in longitudinal section in FIG. 2.

FIG. 2 shows a second exemplary embodiment of the disclosure. This second exemplary embodiment relates to a pressure-medium control valve 60 which is in the form of an independent functional structural unit. The pressure-medium control valve 60 comprises a valve housing 62 having a valve seat 64 formed in one piece thereon, a valve closing body 66 which is movably received and radially guided in the valve housing 62, a valve spring 78 which biases the valve closing body 66 towards the valve seat 64, and a housing cover 84 which is pressed onto a housing shaft 68 of the valve housing 62 and covers an open end of the housing shaft 68.

The valve housing 62, the valve spring 78 and the valve closing body 66 are identical to the valve components of the outlet valve 60 which have been described in connection with the description of the first exemplary embodiment and are therefore provided with the same reference numerals. Exemplary embodiment 2 merely has an additional housing cover 84.

The housing cover 84 is, as mentioned, pressed onto the open end of the valve housing 62. To that end, it is cap-shaped and is divided into a largely planar support surface 86 and a prolongation 88 which is formed in one piece with the support surface 86 and protrudes axially relative to the support surface 86. The prolongation 88 is preferably annular but can also be formed of ring segments which are spaced apart from one another. The internal dimensions of the prolongation 88 are correspondingly matched to the external dimensions of the housing shaft 68 of the valve housing 62.

In the exemplary embodiment, a pressure equalization opening 90 is provided by way of example in the center of the support surface 86, which opening connects the interior of the valve housing 62 with its environment. The valve spring 78 acting on the valve closing body 66 is supported with a second end on an inner side of the support surface 86.

The pressure-medium control valve according to exemplary embodiment 2 is a structural unit which can be operated on its own and in particular can be checked for its functional capability and which, detached from a piston pump according to exemplary embodiment 1, can also be used, for example, as a check valve in a pressure-medium circuit of any kind.

Further modifications or further developments of the described exemplary embodiments are of course conceivable, without departing from the basic concept of the disclosure.

The invention claimed is:

1. A pressure-medium control valve configured to control a throughflow direction in a pressure-medium circuit, comprising:
   a valve housing configured via a forming technique;
   a valve seat; and
   a valve closing body that is received in the valve housing in an axially movable manner and is radially guided by a housing shaft of the valve housing and that controls the valve seat in dependence on the prevailing pressure conditions upstream and downstream of the valve seat, wherein
   the valve seat is configured in one piece with the valve housing,
   the housing shaft is open at an open end,
   the valve closing body is received in an interior of the housing shaft,
   the valve seat is connected to the housing shaft via a peripheral collar that protrudes radially outwards relative to the housing shaft, and
   the collar of the valve housing is defined by two wall portions of the valve housing which are connected together at a periphery of the collar with two interior wall portions of the valve housing crimped together.

2. The pressure-medium control valve as claimed in claim 1, wherein a housing cover is fastened to the open end of the housing shaft, the housing cover supporting a valve spring element that acts on the valve closing body.

3. The pressure-medium control valve of claim 1, wherein the housing shaft is a cylindrical portion of the valve housing.

4. A piston pump configured to pump a pressure medium in an electronically slip-controllable vehicle brake system, comprising:
   a pump piston configured to be driven to perform a cyclic stroke movement;
   a pump cylinder in which the pump piston is received in an axially displaceable manner; and
   a pressure-medium valve that controls a flow of pressure medium through the piston pump, the pressure-medium valve including:
   a valve housing configured via a forming technique,
   a valve seat, and
   a valve closing body that is received by the valve housing in an axially movable manner and is radially guided by a housing shaft of the valve housing and that controls the valve seat in dependence on the prevailing pressure conditions upstream and downstream of the valve seat,
   the valve seat configured in one piece with the valve housing,
   wherein
   the pressure-medium valve is received in a receiver of a closing plug which closes a pump receiver in a housing block of a pump unit with respect to the environment,
   the receiver is graduated in an inside diameter thereof and comprises a first receiving portion which is larger in terms of the inside diameter and a second receiving portion which is smaller in terms of the inside diameter, and
   a transition from the first receiving portion to the second receiving portion forms a shoulder on which the pressure-medium valve rests with a collar of a valve housing,
   the valve housing of the pressure-medium valve extends into the second receiving portion with the smaller diameter of the receiver, and between the valve housing and a wall defining the second receiving portion of the receiver there is an annular gap in communication with an inner portion of the pressure-medium valve.

5. The piston pump as claimed in claim 4, wherein the shoulder is surrounded on a peripheral side by an axially protruding flange of the closing plug, and wherein internal dimensions of the flange are so matched to external dimensions of the collar of the valve housing that a force-based connection is configured to be produced between the collar and the flange.

6. The piston pump as claimed in claim 5, wherein the flange of the closing plug protrudes axially in some regions relative to the collar of the valve housing resting on the shoulder, and wherein the closing plug is connected by a force-based connection to the pump cylinder of the piston pump in the axially-protruding region of the flange.

7. The piston pump of claim 4, wherein the housing shaft is a cylindrical portion of the valve housing.

* * * * *